(12) United States Patent
Kronquist et al.

(10) Patent No.: US 8,520,622 B2
(45) Date of Patent: Aug. 27, 2013

(54) CONTROLLING UPLINK AND DOWNLINK TRANSMISSION POWER DURING ASYNCHRONOUS SWITCHING OF CONTROL STATES BY USER EQUIPMENT

(75) Inventors: Goran Kronquist, Grabo (SE); Anders Astrom, Goteborg (SE); Per Lofving, Molndal (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 238 days.

(21) Appl. No.: 13/176,884

(22) Filed: Jul. 6, 2011

(65) Prior Publication Data
US 2013/0010704 A1 Jan. 10, 2013

Related U.S. Application Data

(63) Continuation of application No. PCT/SE2011/050915, filed on Jul. 6, 2011.

(30) Foreign Application Priority Data

Jul. 6, 2011 (SE) .................. PCT/SE2011/050915

(51) Int. Cl.
*H04Q 7/00* (2006.01)

(52) U.S. Cl.
USPC ............................ 370/329; 370/338; 370/335

(58) Field of Classification Search
None
See application file for complete search history.

(56) References Cited

U.S. PATENT DOCUMENTS

| | | | |
|---|---|---|---|
| 7,006,482 B1 * | 2/2006 | Choi et al. | 370/342 |
| 8,369,228 B2 * | 2/2013 | Cave et al. | 370/244 |
| 8,369,883 B2 * | 2/2013 | Kuroda et al. | 455/522 |
| 2003/0119452 A1 * | 6/2003 | Kim et al. | 455/69 |
| 2004/0082356 A1 | 4/2004 | Walton et al. | |
| 2007/0105580 A1 | 5/2007 | Farnsworth et al. | |
| 2008/0153494 A1 | 6/2008 | Kazmi et al. | |
| 2009/0168750 A1 | 7/2009 | Pelletier et al. | |
| 2009/0181710 A1 | 7/2009 | Pani et al. | |
| 2011/0013615 A1 * | 1/2011 | Lee et al. | 370/344 |

FOREIGN PATENT DOCUMENTS

| | | |
|---|---|---|
| EP | 1 473 850 A2 | 11/2004 |
| EP | 1 487 131 A1 | 12/2004 |
| WO | WO 02/093797 A2 | 11/2002 |
| WO | WO 2004/100565 A2 | 11/2004 |
| WO | WO 2006/081875 A1 | 8/2006 |
| WO | WO 2009/023740 A1 | 2/2009 |
| WO | WO 2009/055662 A2 | 4/2009 |

(Continued)

OTHER PUBLICATIONS

Chen et al,. "Uplink DPCCH Gating of Inactive UEs in Continuous Packet Connectivity Mode for HSUPA", *IEEE Wireless Communications and Networking Conference*, Mar. 11, 2007-Mar. 15, 2007, pp. 1686-1691.

(Continued)

*Primary Examiner* — Duc C Ho
(74) *Attorney, Agent, or Firm* — Myers Bigel Sibley & Sajovec, P.A.

(57) ABSTRACT

A network node is disclosed that communicates with a user equipment node in a communications system. The network node repetitively transmits first uplink transmission power control, TPC, commands on a first physical channel with a first channel configuration while repetitively transmitting second uplink TPC commands on a second physical channel with a second channel configuration. The first and second uplink TPC commands control uplink transmission power from the user equipment node to the network node. Related user equipment nodes and methods are disclosed.

19 Claims, 11 Drawing Sheets

(56) References Cited

FOREIGN PATENT DOCUMENTS

WO    WO 2011/002388 A1    1/2011

OTHER PUBLICATIONS

International Search Report, PCT Application No. PCT/SE2011/050915, Mar. 28, 2012, 4 pages.

Written Opinion of the International Searching Authority, PCT Application No. PCT/SE2011/050915, Apr. 4, 2012, 7 pages.

Change Request: Ericsson et al., "Introduction of 8C-HSDPA", 3GPP Draft; R1-111760 25.214 CR0652 (Release-11,B) 3GPP TSG-RAN WG1 Meeting #65, Barcelona, Spain, May 9-13, 2011, 99 pages.

* cited by examiner

*Uplink Power Control*

Downlink Power Control

CONTROLLING UPLINK AND DOWNLINK TRANSMISSION POWER DURING ASYNCHRONOUS SWITCHING OF CONTROL STATES BY USER EQUIPMENT

CROSS REFERENCE TO RELATED APPLICATION

The present application claims priority to PCT International Application No. PCT/SE2011/050915, filed Jul. 6, 2011, the disclosure of which is incorporated herein by reference as if set forth fully herein.

TECHNICAL FIELD

The present invention relates to communications networks. More particularly, and not by way of limitation, the present invention is directed to communications systems and methods that control uplink and downlink transmission power between network nodes and user equipment nodes.

BACKGROUND

Wideband Code Division Multiple Access (WCDMA) is a mobile radio access network standard specified by a 3rd Generation Partnership Project (3GPP) and used in third generation wireless data/tele-communication systems.

An example third generation communications system 100 is shown in FIG. 1. The system 100 includes a plurality of user equipment nodes (UEs) 110 that communicate with a Node B 120 through a radio air interface. The Node B 120 is controlled by a radio network controller (RNC) 130 and connected to a core network 140.

An enhanced uplink transmission capability from the UEs 110 to the Node B 120 was introduced in release 6 to 3GPP WCDMA. The enhanced uplink provides improved uplink packet-data support with reduced round trip delay, high bit-rate availability and increased cell capacity. As defined by 3GPP WCDMA release 6, during a Radio Resource Control (RRC) state CELL_DCH a network node allocates dedicated resources for each UE 110.

When a UE 110 transmits using the enhanced uplink it transmits data and control information on at least 3 physical channels Dedicated Physical Control CHannel (DPCCH), Enhanced-DPCCH (E-DPCCH), and Enhanced Dedicated Physical Data CHannel (E-DPDCH). The DPCCH transmits pilot bits that are known by the Node B 120 and also Layer 1 control information. The pilot bits are used as a reference by the Node B 120 to estimate the radio channel conditions (e.g. searcher, channel estimation, frequency offset estimation, and signal to interference ratio). The E-DPCCH transmits control information related to the enhanced dedicated physical data channel. The E-DPDCH transmits the data bits.

In 3GPP WCDMA release 8, support for enhanced uplink transmission in state CELL_FACH and IDLE_MODE was introduced. FIG. 2 illustrates two of the states, CELL-FACH configuration and CELL_DCH configuration, which the UEs 110 and Node B 120 can switch between for communications. In the states CELL_FACH and CELL_DCH a UE 110 can utilize common enhanced uplink resources that are setup by the network node for transmission of data on the E-DPDCH. As the number of smart phones increase in communication systems, the number of data transmissions of relatively small data packets will increase. These data packets may not be sufficiently small to be sent on the Random Access Channel which is used for data transmission in state CELL_FACH prior to 3GPP WCDMA release 8. The introduction of enhanced uplink in state CELL_FACH can decrease the load on the Random Access Channel.

Enhanced uplink in CELL_FACH may also provide a seamless RRC connection setup process through which a transition from the common enhanced uplink resource (state CELL_FACH) to a dedicated enhanced uplink resource (state CELL_DCH) takes place. In this way the RRC connection setup latency may be significantly reduced.

While a UE 110 transmits data on the E-DPDCH in state CELL_FACH, it utilizes a common network resource. When the UE 110 needs to make use of the resource for a longer time, the Radio Network Controller (RNC) 130 can switch the UE 110 from the state CELL_FACH to the state CELL_DCH. When the UE 110 switches, the common resource is released and the network assigns a dedicated resource to the UE 110. For the uplink layer 1 processing in the Node B 120, the switch from CELL_FACH to CELL_DCH may be a timing change, a change of uplink (UL) scrambling code, and possibly a change in the TTI. There can also be a change in the maximum data rate and hence a change in signal-to-interference ratio (SIR) target.

When the RNC 130 has decided to switch the UE 110 from the state CELL_FACH to the state CELL_DCH, referred to as an up-switch, it is desirable to do the transition as soon as possible. This will reduce the time that the UE 110 utilizes the common E-DCH resource. The transition can be made synchronous or asynchronous. For a synchronous up-switch, the up-switch takes place at a specified Connection Frame Number (CFN) that is decided by the RNC 130. In contrast, the asynchronous up-switch takes place as soon as the UE 110 can functionally carry out the state switch. An asynchronous up-switch can reduce the transition time significantly relative to a synchronous up-switch. Therefore, an asynchronous up-switch from the state CELL_FACH to the state CELL_DCH can be preferable.

In a WCDMA configuration of the system 110, the uplink and downlink are power controlled. The UE 110 signals to the Node B 120 how it shall regulate its downlink transmission power. In a similar way the Node B 120 signals to the UE 110 how it shall regulate its uplink transmission power. A new transmit power control (TPC) command is signaled every slot (1500 TPC commands per second).

The Node B 120 can control the UL packet error rate performance and UL interference by controlling the transmission power of the UE 110. As the UE 110 increases its transmission power the experienced signal to interference ratio in the Node B 120 will in general increase. An increased signal to interference ratio will result in a lower packet error rate. In this way the Node B 120 can tune the uplink packet error rate.

FIG. 3 illustrates graphs of transmission power levels and associated Transmission Power Control (TPC) commands that may be transmitted from the Node B 120 to a UE 110 through various dedicated physical channels and, vice versa, from the UE 110 to the Node B 120 to control the transmission power levels in the downlink and uplink directions. Referring to FIG. 3, the DPCCH is an UL physical channel which contains known pilot bits and Layer 1 control information. The Node B 120 measures the UL signal-to-interference ratio (SIR) on the DPCCH and compares it with a target value of the SIR. When the measured SIR is above the target SIR, the Node B 120 signals to the UE 110 to decrease its transmission power. When the measured SIR is below the target SIR, the Node B 120 signals to the UE 110 to increase its transmission power. For UEs 110 capable of transmitting enhanced uplink in CELL_FACH, the UL-TPC (Up Link Transmission Power Control) commands are signaled to the UE on the downlink (DL) channel F-DPCH (Fractional Dedicated Physical CHannel).

In a similar manner the UE 110 measures the quality of the F-DPCH that it receives from the Node B 120. When the quality is sufficient the UE 110 signals to the Node B 120 that it can decrease the transmission power on the F-DPCH. When the quality is not sufficient the UE 110 signals to the Node B 120 to increase the transmission power on the F-DPCH. The DL-TPC commands are sent to the network node on the uplink channel DPCCH. The transmission power level of the E-DPCCH and the E-DPDCH may be controlled in response to a power offset relative to the transmission power level of the DPCCH.

US 2009181710 A1 describes how an initial power level is determined to transmit on the DPCCH. The initial power level is determined as the power used by the wireless transmit/receive unit in the CELL_FACH state prior to transitioning to the CELL-DCH state.

EP1487131 A1 describes a method in a network for mobile telecommunications of adjusting the transmission power of a Forward Access Channel (FACH) from a base station to a mobile user terminal. When a mobile user terminal transits from a CELL-FACH state to a CELL-DCH state, the initial transmission power to the mobile user terminal in the CELL-DCH state depends upon the last adjusted transmission power level in the preceding CELL-FACH state.

It is desirable to have a seamless, i.e. no loss of data at layer 1, transition from the state CELL_FACH to the state CELL_DCH. At the same time it is desirable to have an unsynchronized transition in order to obtain a fast state transition. From a downlink layer 1 perspective, the up-switch can correspond to a change in timing and possibly, channel code of the F-DPCH. From an uplink layer 1 perspective, the up-switch can correspond to a change of scrambling code and timing from a channel configuration of the first state to the scrambling code and timing of a channel configuration of the second state. The change in timing is the same in downlink and uplink.

In case of an asynchronous up-switch from the first state to the second state (i.e., from the state CELL_FACH to the state CELL_DCH), the new timing is known by the Node B 120 but the exact switch moment is not known by the Node B 120. The uplink layer 1 processing in the Node B 120 has to detect when the change of scrambling code and timing has taken place. The detection algorithm needs to perform the detection sufficiently fast in order not to lose any data that is transmitted on the E-DPDCH.

Since the Node B 120 does not know the exact switch time, it would be difficult or not possible to provide efficient transmit power regulation at the moment when the up-switch occurs. Too high of a UE 110 transmission power will increase the interference level in the communication cell provided by the Node B 120 which will have a negative effect on the cell throughput. In contrast, too low of a UE 110 transmission power will lead to an increased packet error rate and could result in a radio link failure.

In the DL, too high of a transmission power for the F-DPCH to one UE 110 will consume DL power resource, which could have been used for communication from the Node B 120 or another Node B to other UEs 110. The result could be a decreased cell throughput in the DL. In contrast, too low of a transmission power for the F-DPCH can cause an increased error rate for the UL-TPC commands, which may result in decreased performance in the UL.

SUMMARY

Various embodiments of the present invention are directed to controlling uplink and downlink transmission power between a network node and a UE when the network node and UE are switching between states (e.g., from the state CELL_FACH to the state CELL_DCH).

In one embodiment, a network node of a communications system includes a transceiver and a controller circuit. The transceiver communicates with a UE. The controller circuit is connected to the transceiver and configured to repetitively transmit first uplink transmission power control (TPC) commands on a first physical channel with a first channel configuration while repetitively transmitting second uplink TPC commands on a second physical channel with a second channel configuration. The first and second uplink TPC commands control uplink transmission power from the UE to the network node.

Because the network node transmits first uplink TPC commands on the first physical channel while transmitting second uplink TPC commands on the second physical channel, the UE can control its uplink transmission power responsive to the first uplink TPC commands while in a first state. When the UE performs an up-switch to a second state it can begin uplink transmission to the network node at a power that is controlled by the second uplink TPC commands.

In some more detailed embodiments, the first physical channel may be a first F-DPCH with a CELL_FACH configuration. The second physical channel may be a second F-DPCH with a CELL_DCH configuration and/or a Dedicated Physical Control CHannel. The controller circuit may receive a message indicating that the network node and the UE will up-switch from a first state controlling uplink transmission power responsive to the first uplink TPC commands to a second state controlling uplink transmission power responsive to the second uplink TPC commands. The controller circuit may initiate the repetitive transmissions of the second uplink TPC commands in response to receiving a message and while maintaining the repetitive transmissions of the first uplink TPC commands, and may cease the repetitive transmissions of the first uplink TPC commands responsive to a determination that the UE has switched states.

Another related embodiment is directed to a UE that includes a transceiver and a controller circuit. The transceiver communicates with a network node of a communication system. The controller circuit is connected to the transceiver to transmit and receive, and is configured to receive a message from the network node commanding the UE to switch from a first state, that controls uplink transmission power to the network node responsive to first uplink TPC commands received on a first physical channel with a first channel configuration, to a second state, that controls uplink transmission power to the network node responsive to second uplink TPC commands received on a second physical channel with a second channel configuration. The controller circuit responds to the message by beginning uplink transmission at a power that is controlled by the second uplink TPC commands received from the network node following a UE uplink transmission gap while switching from the first state to the second state.

In some more detailed embodiments, the controller circuit responds to the message by ceasing monitoring of the first physical channel for the first uplink TPC commands and initiating monitoring of the second physical channel for the second uplink TPC commands while switching from the first state to the second state. The UE may asynchronously switch from the first state to the second state without synchronizing with the network node a timing of when the UE will perform the state switching. The first physical channel may be a first F-DPCH with a CELL_FACH configuration, and the second physical channel may be a second F-DPCH with a CELL_FACH configuration.

Another related embodiment is directed to a method for power control in a network node that communications with a UE in a communications system. The method includes repetitively transmitting first uplink transmission power control, TPC, commands on a first physical channel with a first channel configuration while repetitively transmitting second uplink TPC commands on a second physical channel with a second channel configuration. The first and second uplink TPC commands control uplink transmission power from the UE to the network node.

Another related embodiment is directed to a method for power control in a UE that communicates with a network node in a communications system. The method includes receiving a message from the network node commanding the UE to switch from a first state, that controls uplink transmission power to the network node responsive to first uplink TPC commands received on a first physical channel with a first channel configuration, to a second state, that controls uplink transmission power to the network node responsive to second uplink TPC commands received on a second physical channel with a second channel configuration. In response to the message, uplink transmission is begun at a power that is controlled by the second uplink TPC commands received from the network node following a UE uplink transmission gap while switching from the first state to the second state.

Other network nodes, UEs, and/or methods according to embodiments of the invention will be or become apparent to one with skill in the art upon review of the following drawings and detailed description. It is intended that all such additional network nodes, UEs, and/or methods be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

As explained above, various embodiments of the present invention are directed to controlling uplink and downlink transmission power between a network node (e.g., a Node B) and a UE when the network node and UE are switching between states (e.g., from the state CELL_FACH to the state CELL_DCH).

Figure 1:
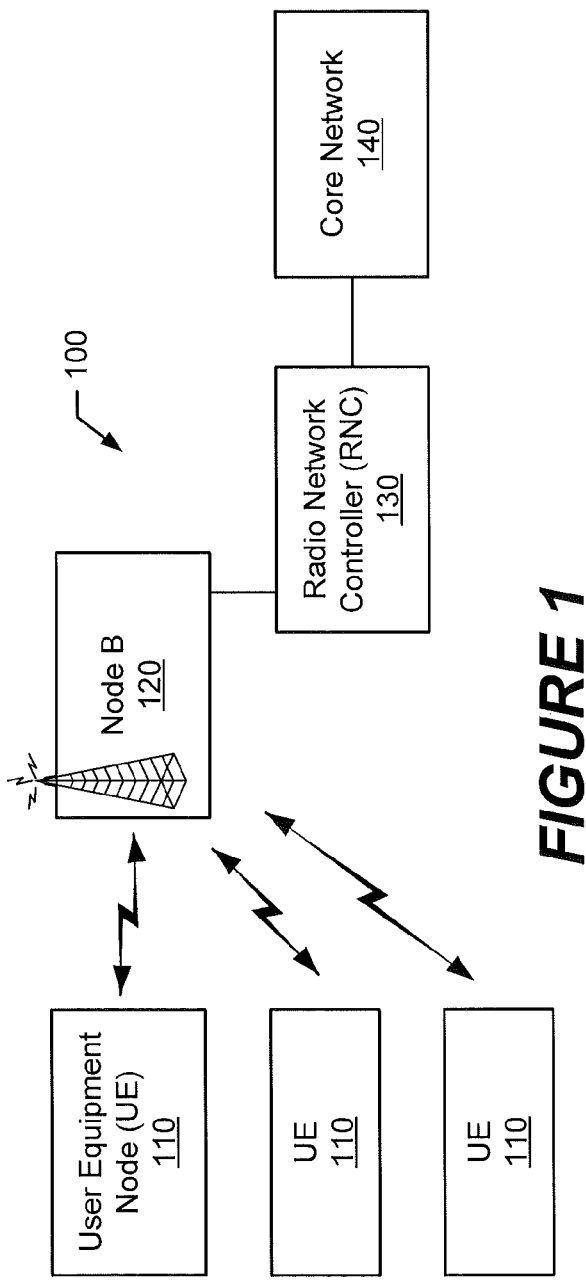
FIG. 1 is a block diagram of a communications system that regulates uplink and downlink transmission power between a Node B and user equipment nodes.
Figure 2:
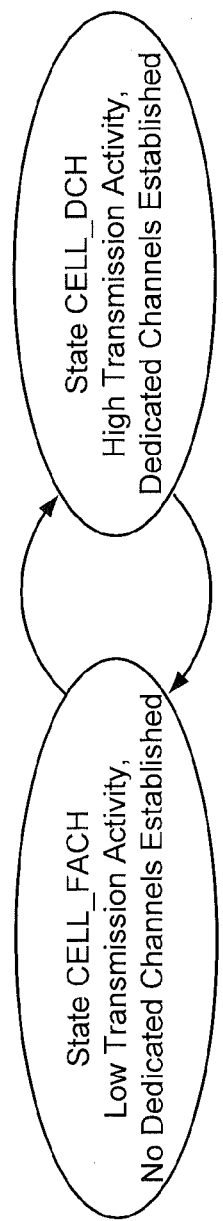
FIG. 2 illustrates two of the states of the Node B and a user equipment node of the communications system of FIG. 1.
Figure 3:
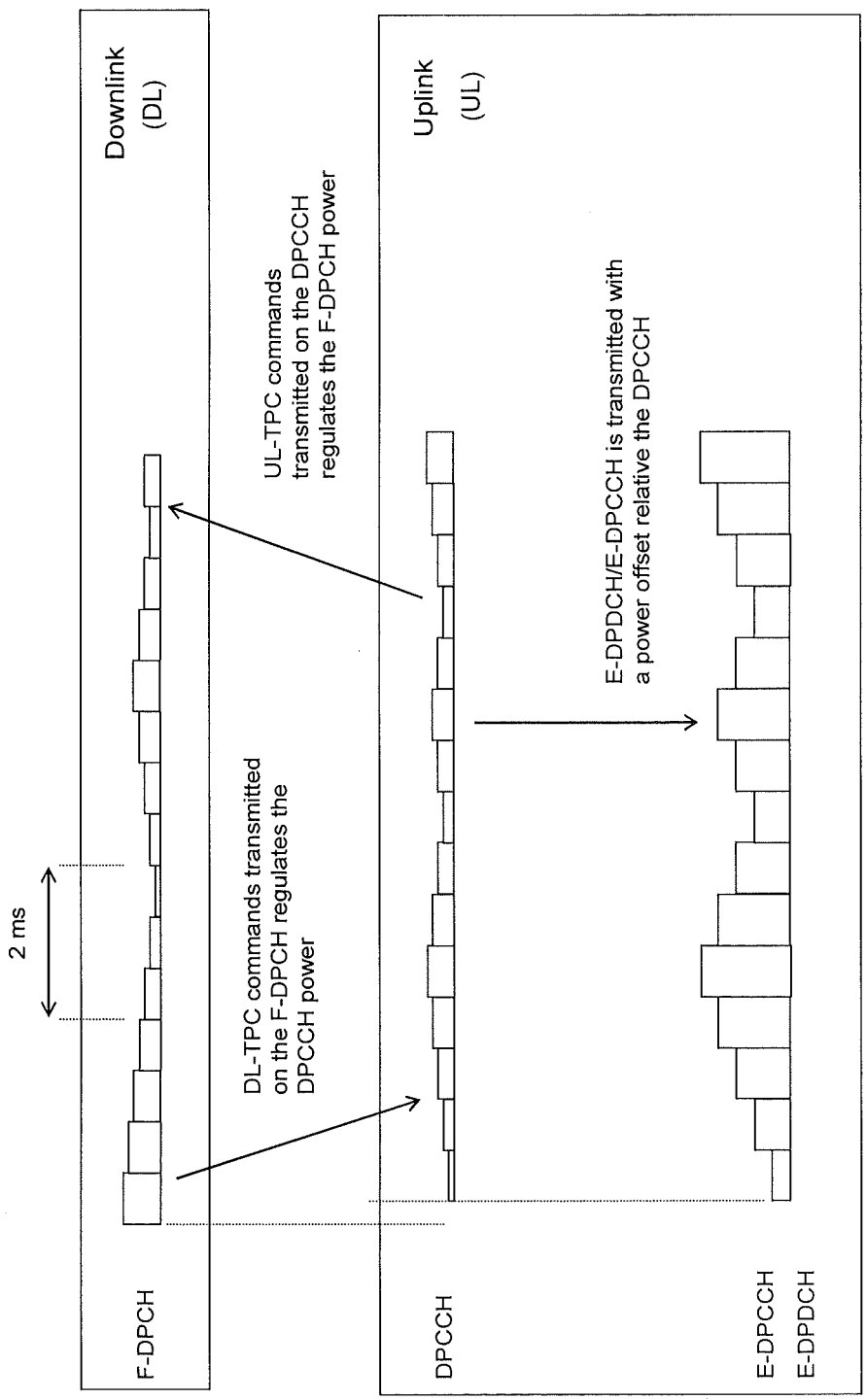
FIG. 3 illustrates graphs of transmission power levels and associated TPC commands that may be transmitted from the Node B to a UE through dedicated physical channels and vice versa to control the transmission power levels in the downlink and uplink directions.

Some embodiments are disclosed in the context of a WCDMA 3GPP third generation communication system, such as the system 100 of FIG. 1, for ease of illustration and explanation only. However, the invention is not limited thereto as it may be embodied in other types of network nodes, UEs, and communication systems, including, but not limited to, 3GPP Long Term Evolution (LTE) systems.

Figure 4:
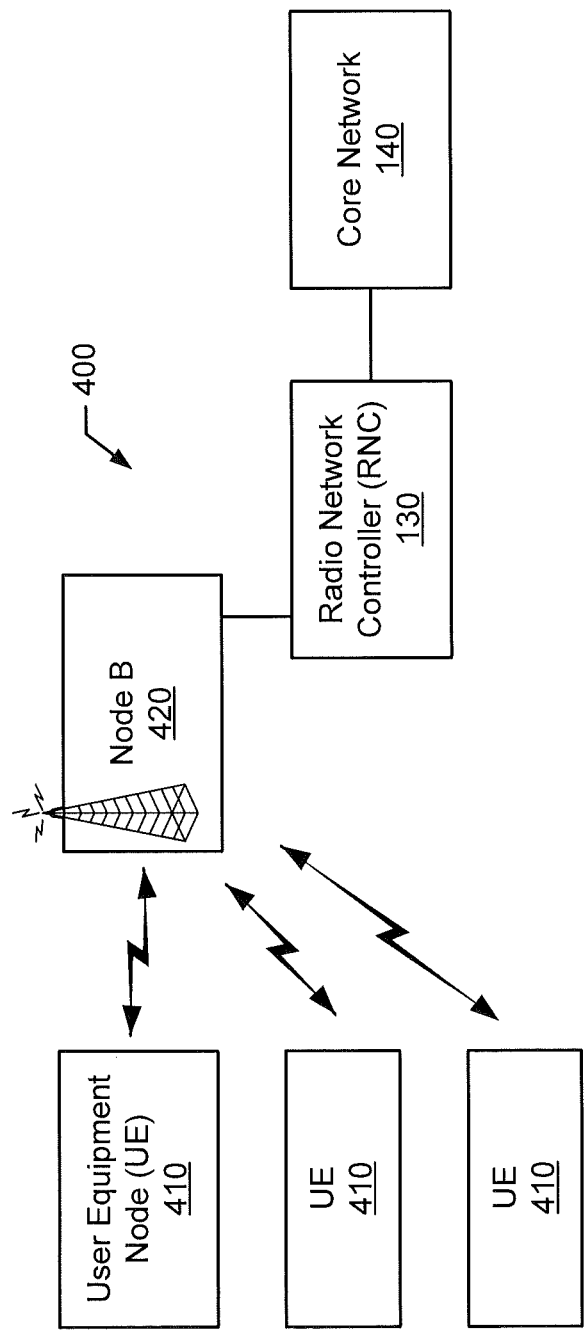
FIG. 4 is a block diagram of a communications system that regulates uplink and downlink transmission power between a Node B and user equipment nodes according to some embodiments of the present invention.

An example communications system 400 that is configured according to some embodiments is shown in FIG. 4. The system 400 includes a plurality of user equipment nodes (UEs) 410 that communicate with a Node B 420 through a radio air interface. The UEs 410 may include mobile telephones ("cellular" telephones), data terminals, and/or other processing devices with wireless communication capability, such as, for example, portable computers, pocket computers, hand-held computers, laptop computers, electronic book readers, and video game consoles.

The Node B 420 is controlled by a radio network controller (RNC) 130 and is connected to a core network 140. The RNC 130 and the core network 140 may be the same as shown in system 100 of FIG. 1. The UEs 410 and Node B 420 can be configured to operate as explained above for the UEs 110 and Node B 120 of FIG. 1, except that the UEs 410 and Node B 420 are further configured to control uplink and downlink transmission power when the Node B 420 and UEs 410 perform an up-switch from the state CELL_FACH to the state CELL_DCH.

Uplink Power Control

To enable uplink power control during up-switch, the Node B 420 repetitively transmits first uplink TPC commands on a first physical channel (e.g., a first F-DPCH with a CELL_FACH configuration) while repetitively transmitting second uplink TPC commands on a second physical channel (e.g., a second F-DPCH with a CELL_DCH configuration and/or a DPCCH with a CELL_DCH configuration). The first and second uplink TPC commands control uplink transmission power from the UE 410 to the Node B 420. From a downlink layer 1 perspective, the up-switch may be a change in timing and possibly, channel code between the CELL_FACH configuration to the CELL_DCH. From an uplink layer 1 perspective, the up-switch may be a change of scrambling code, channel code, and/or timing from the CELL_FACH configuration to the scrambling code, channel code, and/or timing of the CELL_DCH configuration.

Figure 5:
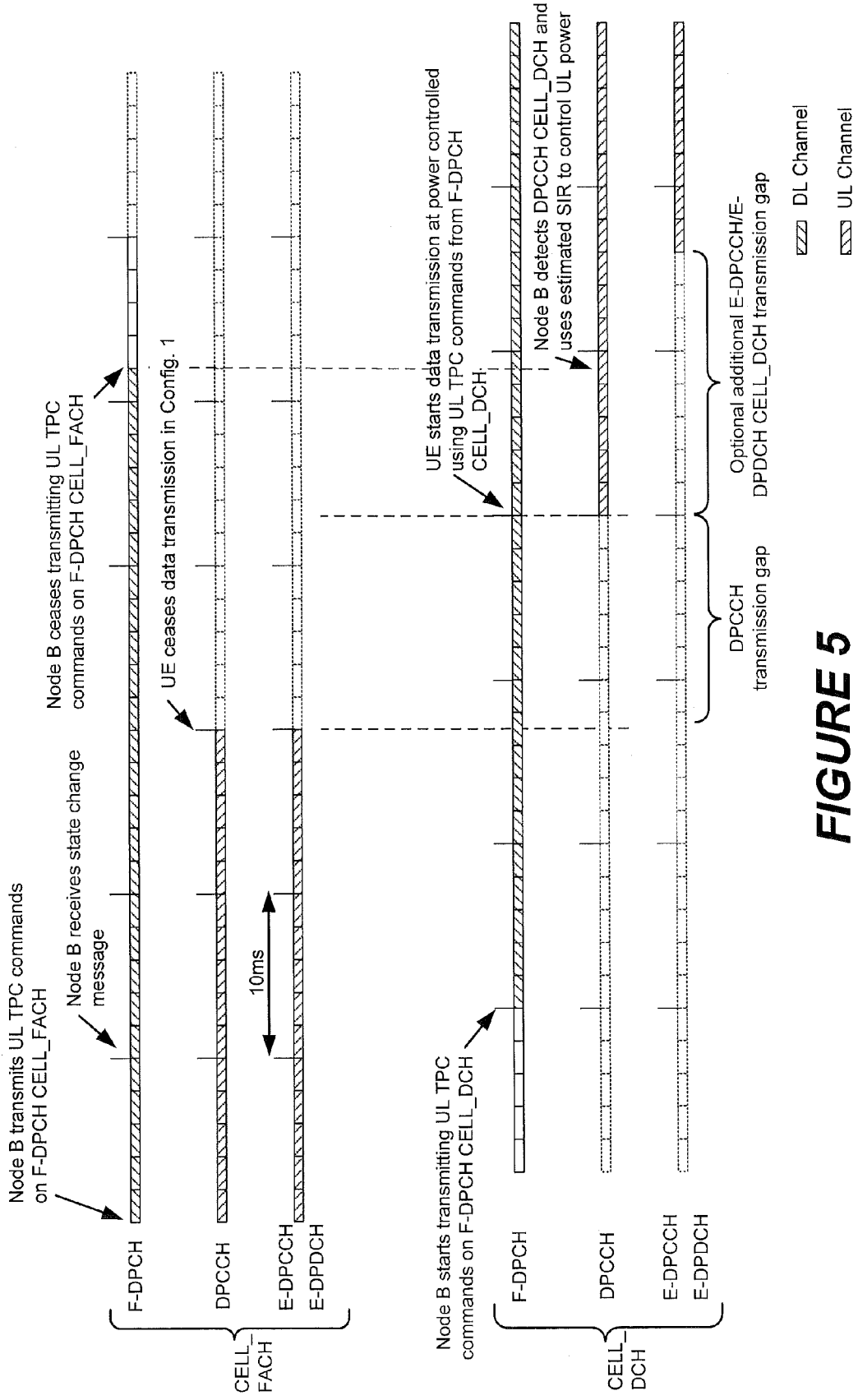
FIGS. 5-8 illustrate operations and methods for controlling uplink transmission power leading up to, during, and following an up-switch between operational states in accordance with some embodiments of the present invention.
Figure 6:
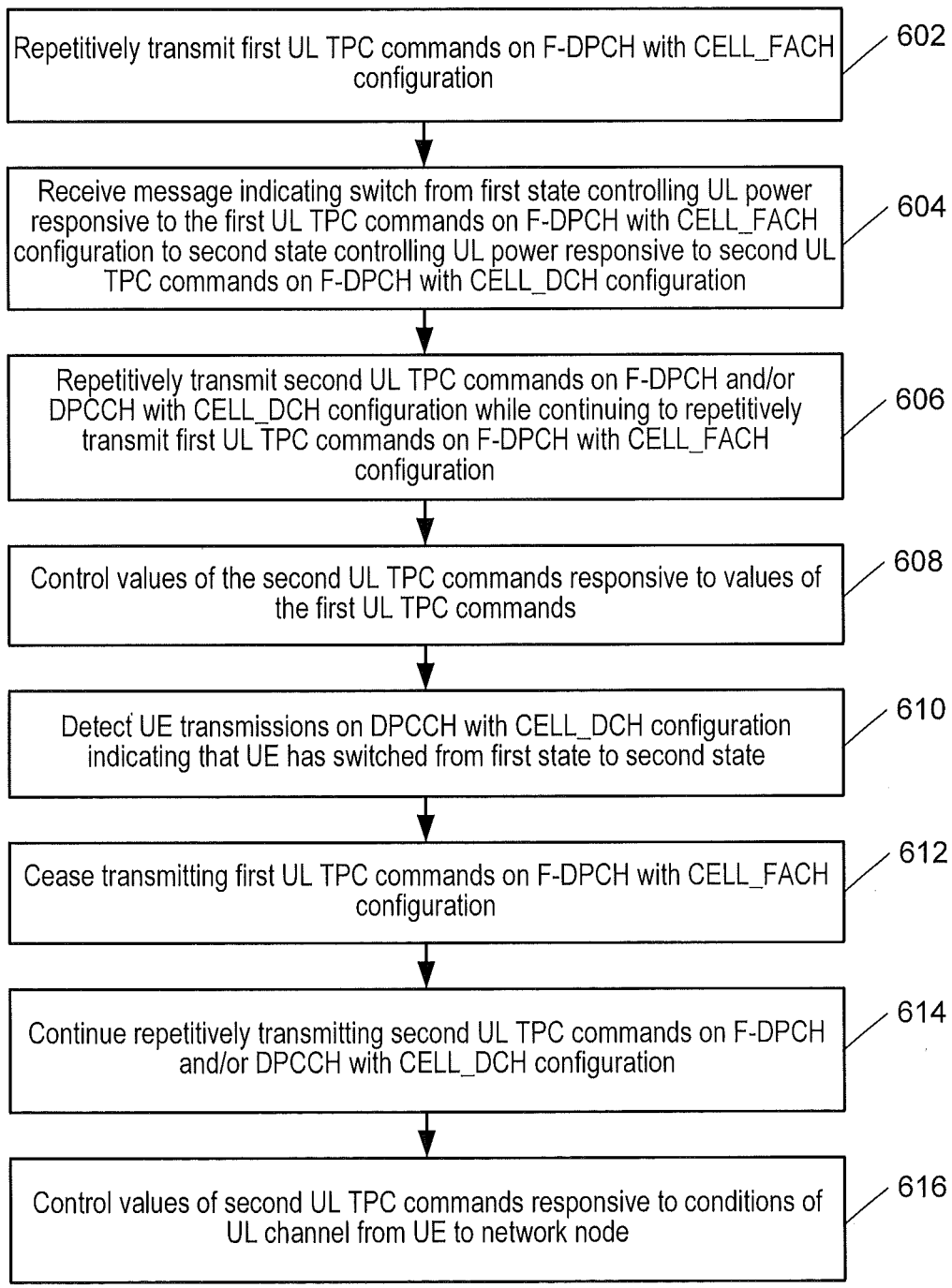
Figure 7:
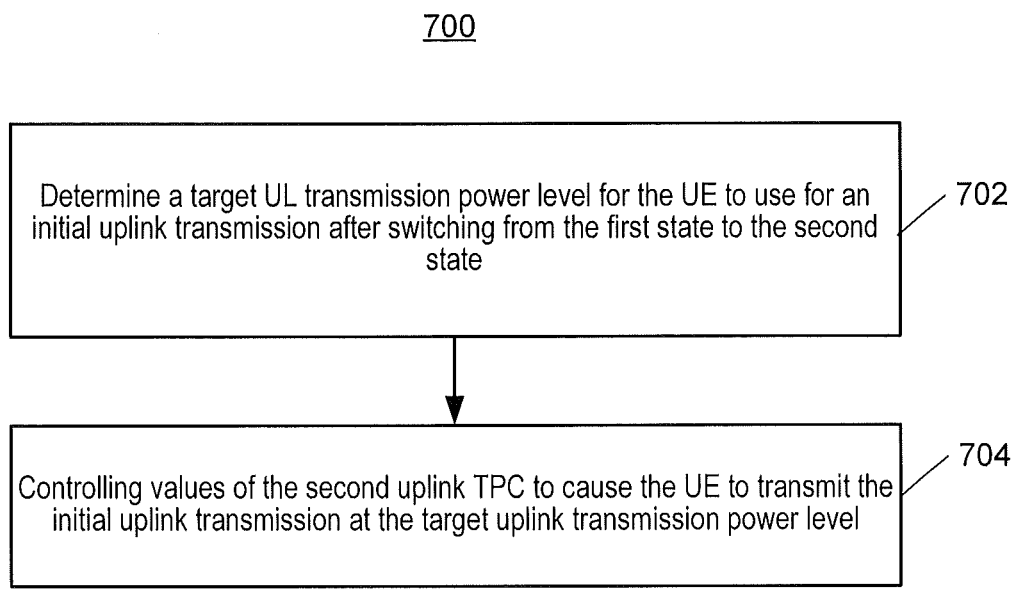
Figure 8:
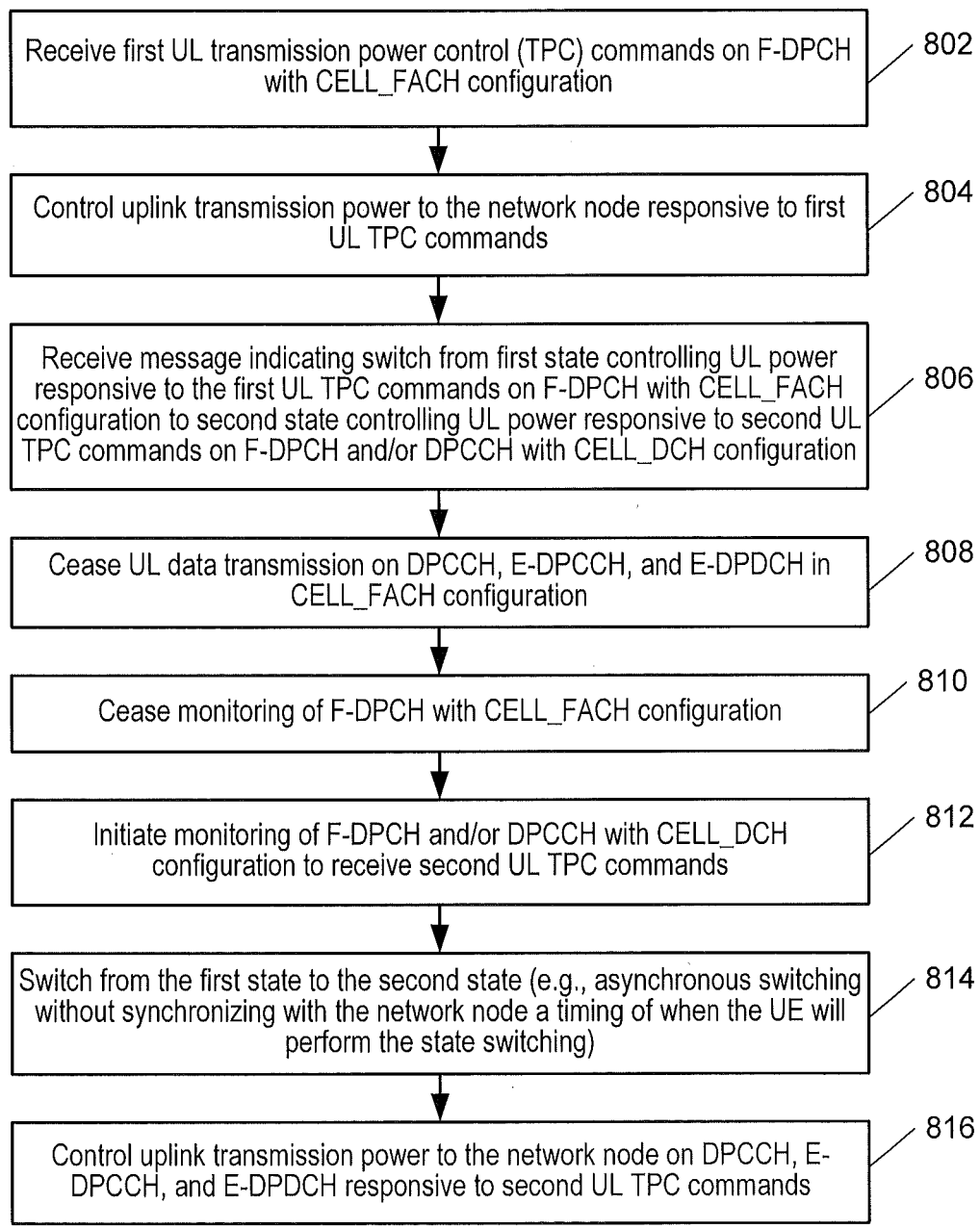

FIGS. 5-8 illustrate operations and methods for controlling uplink transmission power leading up to, during, and following an up-switch between operational states (e.g., from the state CELL_FACH to the state CELL_DCH), which may be unsynchronized, in accordance with some embodiments of the present invention. FIG. 5 illustrates a first set of physical channels (e.g. F-DPCH, DPCCH, E-DPCCH, and E-DPDCH with CELL_FACH configuration) that are used in the first state and a second set of physical channels (e.g. F-DPCH, DPCCH, E-DPCCH, and E-DPDCH with CELL_DCH configuration) that are used in the second state, and associated operations and methods for controlling the first and second set of physical channels. FIG. 6 illustrates a flowchart of operations and methods 600 that may be performed by the Node B 420 to perform uplink power control during up-switch. FIG. 8 illustrates a flowchart of operations and methods 800 that may be performed by the UE 410 to perform uplink power control during up-switch.

Referring initially to FIGS. 5, 6, and 8, the Node B 420 and the UE 410 are initially in the first state where the Node B 420 repetitively transmits (block 602) first UL TPC commands on the F-DPCH with the CELL_FACH configuration. The UE 410 receives (block 802) the first UL TPC commands, and controls (block 804) its uplink transmission power to the Node B 420. The Node B 420 and the UE 410 each receive a message (blocks 604 and 806) from the radio network controller 130 notifying/instructing them to perform an up-switch from the first state (e.g., state CELL_FACH) to the second state (e.g., state CELL_DCH). In first state, the UL power from the UE 410 is controlled responsive to the first UL TPC commands on the F-DPCH with the CELL_FACH configuration. In contrast, in the second state the UL power is controlled responsive to the second UL TPC commands on the F-DPCH with the CELL_DCH configuration and/or the DPCCH with the CELL_DCH configuration.

The Node B 420 responds to the message by repetitively transmitting second UL TPC commands (block 606) on the F-DPCH with the CELL_DCH configuration while continuing to repetitively transmit the first UL TPC commands on the F-DPCH and/or the DPCCH with the CELL_FACH configuration. The Node B 420 controls (block 608) values of the second UL TPC commands responsive to values of the first UL TPC commands. Because the UE 410 does not listen for or react to the second UL TPC commands until it starts up-switch transitioning from the first state to the second state, the Node B 420 can start transmitting the second UL TPC commands with values that are defined to provide an efficient initial uplink transmission by the UE 410 at a target uplink transmission power level when the UE 410 begins uplink transmissions in the second state.

FIG. 7 illustrates a flowchart of operations and methods 700 that may be performed by the Node B 420 to cause the UE 410 to perform an initial uplink transmission, after switching to the second state, at a target uplink transmission power level. The Node B 420 or the RNC 130 may determine (block 702) the target uplink transmission power level responsive to a present uplink transmission power level in the first state, and may be further determined responsive to a difference between uplink transmission characteristics between the first and second states. For example, the target uplink transmission power level may be determined responsive to a present transmission time interval (TTI) of the UE 410 in the first state and a planned TTI of the UE 410 in the second state, responsive to a change in service (e.g., switch between a packet data service and speech service) provided for the UE 410 between the first and second states, and/or responsive to a change in channel coding between the first and second states (e.g., transition from PSK to PAM). The target power level may, for example, be increased when the TTI of the second state is smaller than the TTI of the first state to enable uplink data transmission at a higher rate, and/or when the UE 410 is transitioning from voice service to packet data service.

The Node B 420 controls (block 704) values of the second uplink TPC commands to cause the UE 410 to make the initial uplink transmission in the second state at the target uplink transmission power level. Because the second UL TPC commands are already being transmitted on the F-DPCH and/or the DPCCH with the CELL_DCH configuration while the UE 410 is not transmitting (during the DPCCH transmission gap), the UE 410 can immediately start using the second UL TPC commands to control its uplink transmission power when it begins transmitting in the second state. The UE 410 can perform detection of the scrambling code of the F-DPCH and/or the DPCCH with the CELL_DCH configuration and initialize its TPC transmission power control loops responsive to the second uplink TPC commands when it is ready to begin transmitting on the physical channels with the CELL_DCH configuration at a target uplink transmission power level.

Values of the second uplink TPC commands may be controlled to transition the UE 410 from a present uplink transmission power level to the target uplink transmission power level while the UE 410 is not transmitting when switching from the first state to the second state. The transition between the present and target uplink transmission power levels can be controlled to provide an efficient transition from a present signal-to-interference ratio (SIR) level in the first state to a target SIR level in the second state. The transition may occur abruptly from a present level to a target level or it may be controlled to occur more gradually according to a defined pattern, such as along a discrete (e.g. series of incremental steps) or continuous linear or nonlinear path.

Referring again to FIGS. 5, 6, and 8, the UE 410 determines the timing for when it will perform the up-switch responsive to the received message. When the UE 410 is ready (e.g., completed a presently queued transmission), it ceases UL data transmission (block 808) on the DPCCH, E-DPCCH, and E-DPDCH with the CELL_FACH configuration. The UE 410 also ceases monitoring (block 810) of the F-DPCH with the CELL_FACH configuration.

During the gap in uplink transmissions on the DPCCH, the UE 410 monitors (block 812) the F-DPCH and/or the DPCCH with the CELL_DCH configuration to receive the second UL TPC commands. The UE 410 switches (block 814) from the first state to the second state, and may perform the switch without synchronizing with the Node B 420 a timing of when the UE 410 will perform the up-switch (i.e., unsynchronized up-switch). The UE 410 begins uplink transmissions (block 816) to the Node B 420 on the DPCCH with the CELL_DCH configuration while controlling transmission power level responsive to the second UL TPC commands. The UE 410 may at the same time or later begin uplink transmissions to the Node B 420 on the E-DPCCH and the E-DPDCH with the CELL_DCH configuration. The transmission power level on the E-DPCCH and the E-DPDCH may be controlled based on a defined offset power level relative to a power level of the DPCCH with the CELL_DCH configuration.

The Node B 420 detects (block 610) a reliable transmission from the UE 410 on the DPCCH with the CELL_DCH configuration, which indicates that the UE 410 has switched from the first state to the second state. The Node B 420 responds to the detection by ceasing transmission (block 612) of the first UL TPC commands while continuing repetitive transmissions (block 614) of the second UL TPC commands. Alternatively or additionally, the Node B 420 may cease transmission of the first UL TPC commands on the F-DPCH with the CELL_FACH state in response to a radio link failure on the uplink physical channel with the CELL_FACH state from the UE 410.

Values of the second UL TPC commands are controlled (block 616) responsive to conditions of the UL channel from the UE 410 to the Node B 420. For example, values of the second UL TPC commands may be controlled responsive to SIR estimates on signals received from the UE 410 on the DPCCH with the CELL_DCH configuration.

In some embodiments, the UE 410 may begin uplink transmission on the DPCCH with CELL_DCH configuration before receiving the second UL TPC commands and may control further uplink transmissions on the DPCCH and initial or subsequent transmissions on the E-DPCCH and/or E-DPDCH responsive to the second UL TPC commands when they are received.

Downlink Power Control

Figure 9:
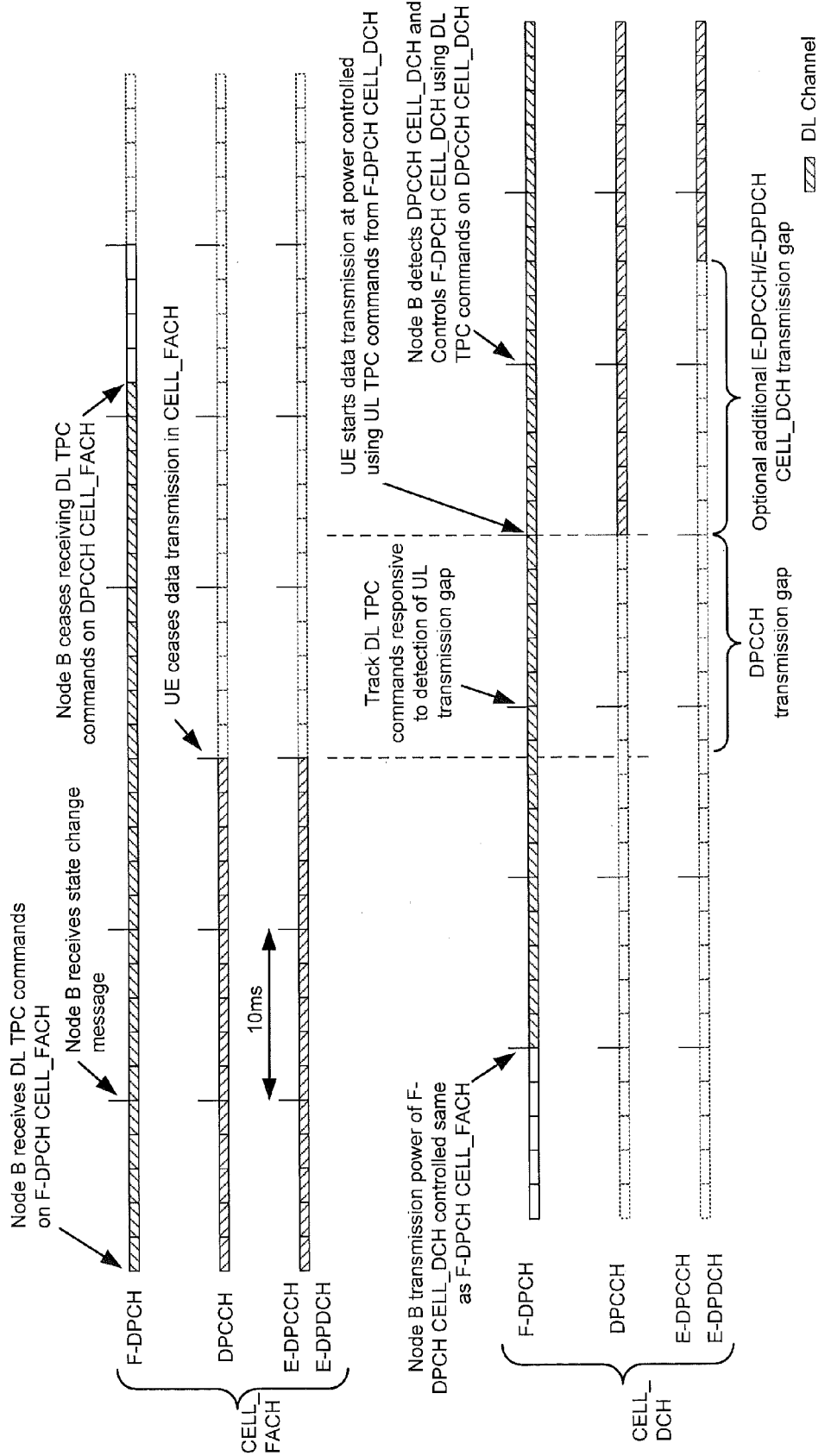
FIGS. 9-11 illustrate operations and methods for controlling downlink transmission power leading up to, during, and following an up-switch between operational states in accordance with some embodiments of the present invention.
Figure 10:
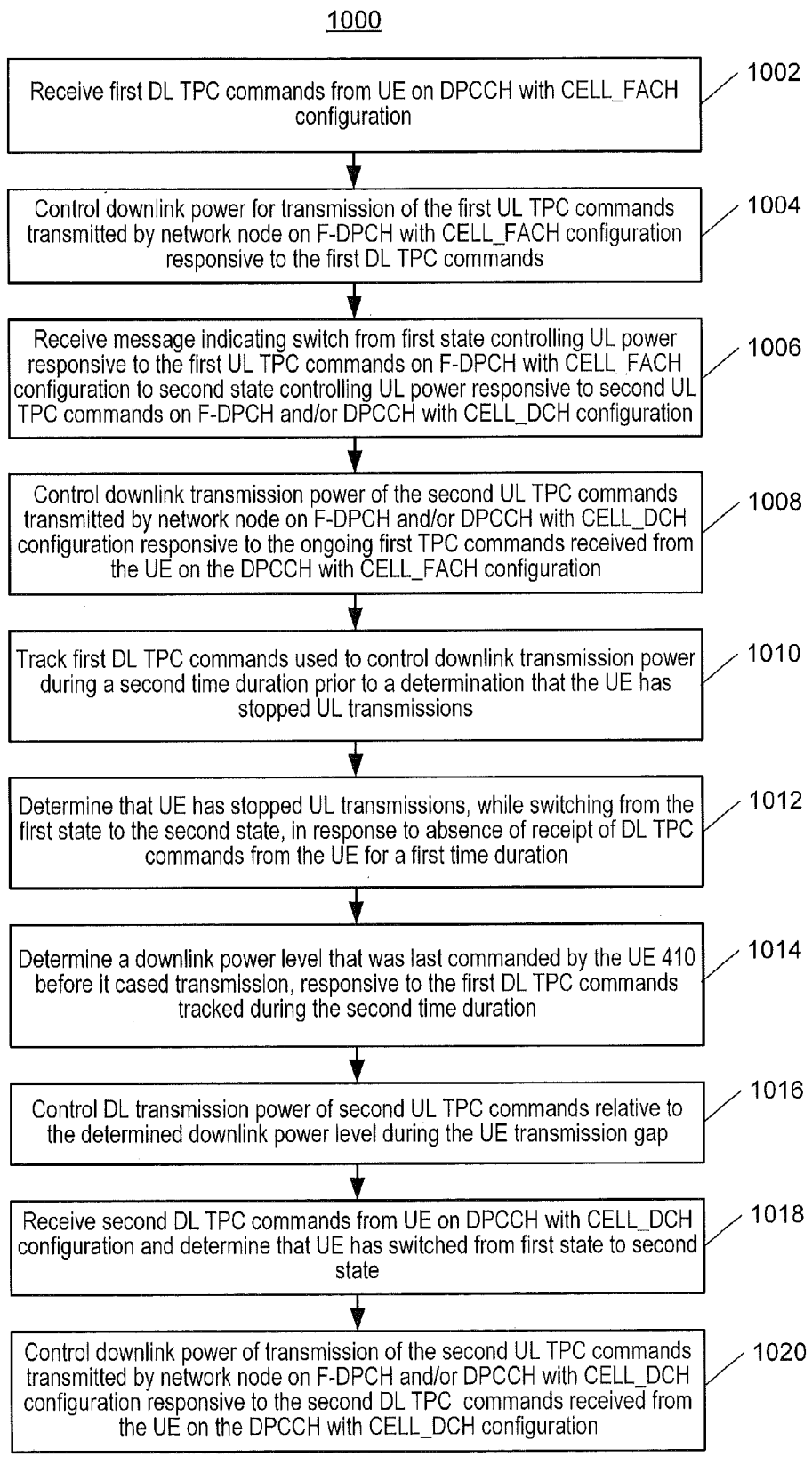
Figure 11:
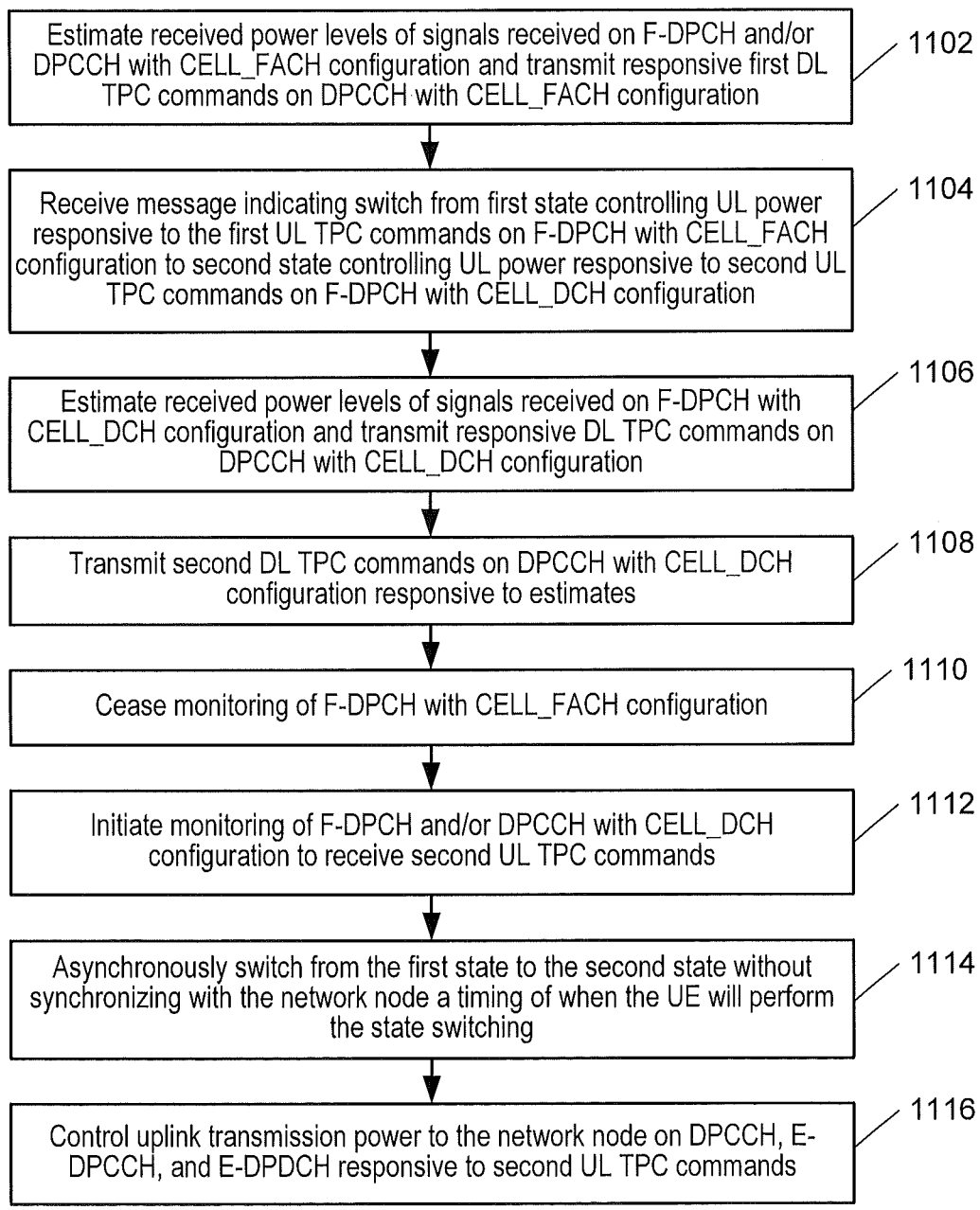

FIGS. 9-11 illustrate operations and methods for controlling downlink transmission power leading up to, during, and following an up-switch between operational states (e.g., from the state CELL_FACH to the state CELL_DCH), which may be unsynchronized, in accordance with some embodiments of the present invention. FIG. 9 illustrates first and second sets of physical channels which corresponding to the physical channels shown in FIG. 5. FIG. 10 illustrates a flowchart of operations and methods 1000 that may be performed by the Node B 420 to perform downlink power control during up-switch. FIG. 11 illustrates a flowchart of operations and methods 1100 that may be performed by the UE 410 to perform downlink power control during up-switch.

Referring to FIGS. 9-11, the Node B 420 and the UE 410 are initially in the first state where the UE 410 generates (block 1102) estimates of received power levels of signals received on the F-DPCH and/or the DPCCH with the CELL_FACH configuration, and repetitively transmits responsive first DL TPC commands on the DPCCH with the CELL_FACH configuration. The Node B 420 receives (block 1002) the first DL TPC commands, and controls (block 1004) downlink transmission power of the first UL TPC commands transmitted on the F-DPCH with the CELL_FACH configuration responsive to the first DL TPC commands.

The Node B 420 and the UE 410 each receive a message (blocks 1006 and 1104) from the radio network controller 130 notifying/instructing them to perform an up-switch from the first state (state CELL_FACH) to the second state (state CELL_DCH). The Node B 420 responds to the message by starting repetitive transmission of the second UL TPC commands transmitted on the F-DPCH and/or the DPCCH with the CELL_DCH configuration while continuing the repetitive transmissions of the first UL TPC commands transmitted on the F-DPCH with the CELL_FACH configuration. The transmission power of the first and second UL TPC commands is controlled (block 1008) responsive to the ongoing repetitive first TPC commands received from the UE 410.

The Node B 420 determines (block 1012) that the UE 410 has stopped uplink transmissions while the UE 410 switches from the first state to the second state, in response to an absence of receipt of the first DL TPC commands from the UE 410 for a first time duration. The Node B 420 can perform incorrect downlink transmission power control between the time that the UE 410 stops transmitting DL TPC commands and the corresponding delayed determination by the Node B 420 that the UE 410 has stopped transmission. To allow compensation (e.g., correction) for the incorrect downlink transmission power control, the Node B 420 can track (block 1010) the first DL TPC commands that it has used to control downlink transmission power during a second time duration prior to the determination that the UE 410 has stopped uplink transmissions to the Node B 420. The Node B 420 can then compensate for at least some of the first DL TPC commands tracked during the second time duration to adjust its downlink transmission power (block 1014) during the UE transmission gap. The first time duration may be set equal to the second time duration, and may be equal to a DTX detection interval of a DTX detector in the Node B 420.

For example, the Node B 420 may use the tracked first DL TPC commands to determine (block 1014) a downlink power level that was last commanded by the UE 410 before it ceased transmission, and control (block 1016) its downlink transmission power level during the UE 410 transmission gap responsive to the determined downlink power level. The Node B 420 may keep its downlink transmission power level at the determined downlink power level during the UE 410 transmission gap, may slowly increase its downlink transmission power level (e.g., toward a maximum allowed level) to compensate for a fading channel, or may perform other defined operations to control its downlink transmission power level relative to the determined downlink power level.

The Node B 420 may incorrectly determine that the UE 410 has stopped transmission (when the UE 410 is actually still transmitting) due to, for example, use of incorrect scrambling codes. In some embodiments, the Node B 420 can use the tracked first DL TPC commands to compensate for any incorrect downlink transmission power control that may have occurred following an initial incorrect determination that the UE 410 has stopped transmission while apparently performing an up-switch, when a subsequent determination shows that the UE 410 had not stopped transmission.

The UE 410 responds to the message regarding up-switch by monitoring signals received on the F-DPCH with the CELL_DCH configuration, and estimating (block 1106 of FIG. 11) received power levels of the signals. The UE 410 transmits (block 1108) second DL TPC commands on the DPCCH with the CELL_DCH configuration responsive to the power level estimates.

As explained above, the UE 410 determines the timing for when it will perform the up-switch responsive to the received message. When the UE 410 is ready, it ceases monitoring (block 1110) of the F-DPCH with the CELL_FACH configuration, and initiates monitoring (block 1112) of the F-DPCH and/or DPCCH with the CELL_DCH configuration to receive the second UL TPC commands. The UE 410 asynchronously switches (block 1114) from the first state to the second state without synchronizing with the Node B 420 a timing of when the UE 410 will perform the up-switch. The UE 410 begins uplink transmission power to the Node B 420 on the DPCCH with the CELL_DCH configuration while controlling (block 1116) transmission power level responsive to the second UL TPC commands. The UE 410 may at the same time or later begin uplink transmissions to the Node B 420 on the E-DPCCH and the E-DPDCH with the CELL_DCH configuration. The transmission power level on the E-DPCCH and the E-DPDCH may be controlled based on a defined offset power level relative to a power level of the DPCCH with the CELL_DCH configuration.

The Node B 420 receives (block 1018) a reliable transmission of the second DL TPC commands from the UE 410 on the DPCCH with the CELL_DCH configuration, and determines that the UE 410 has switched from the first state to the second state. The Node B 420 responds to the determination by controlling (block 1020) downlink power of transmission of the second UL TPC commands on the F-DPCH and/or DPCCH with the CELL_DCH configuration responsive to the second DL TPC commands received from the UE 410 on the DPCCH with the CELL_DCH configuration.

Example User Equipment Node and Network Node Configurations

Figure 12:
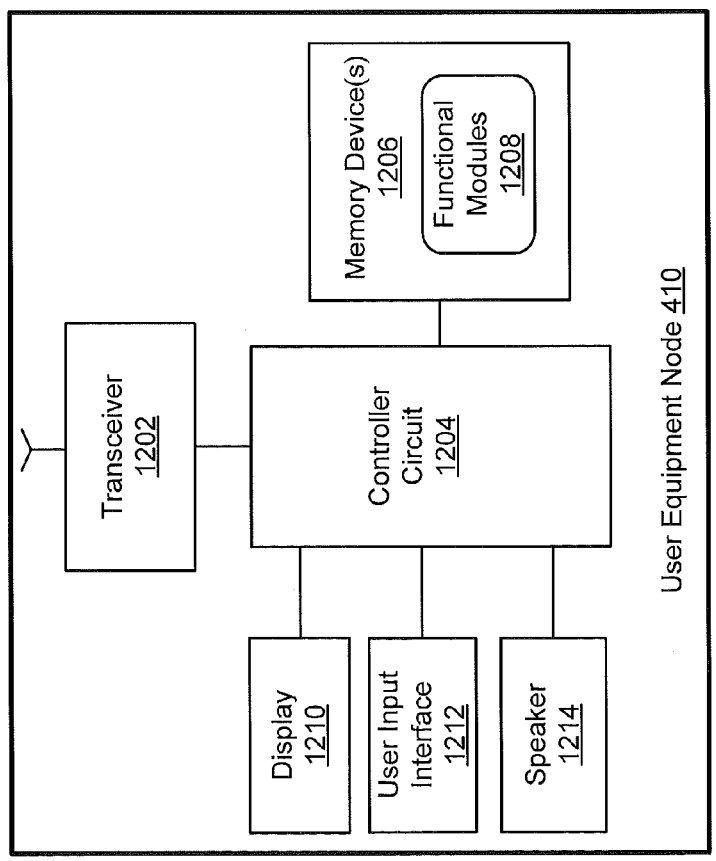
FIG. 12 is a block diagram of the UE of the communications system of FIG. 4 that is configured according to some embodiments of the present invention.

FIG. 12 is a block diagram of the user equipment node (UE) 410 of FIG. 4 that is configured according to some embodiments. The UE 410 includes a transceiver 1202, a controller circuit 1204, and a memory device(s) 1206 containing functional modules 1208. The UE 410 may further include a display 1210, a user input interface 1212, and a speaker 1214.

The transceiver 1202 (e.g., WCDMA, LTE, or other cellular transceiver, Bluetooth transceiver, WiFi transceiver, WiMax transceiver, etc.) is configured to communicate with the Node B 420 or another network node of the communication system 400 or another communication system. The controller circuit 1204 may include one or more data processing circuits, such as a general purpose and/or special purpose processor (e.g., microprocessor and/or digital signal processor). The controller circuit 1204 is configured to execute computer program instructions from the functional modules 1208 of the memory device(s) 1206, described below as a computer readable medium, to perform at least some of the operations and methods of FIGS. 1-11 described herein as being performed by a UE.

Figure 13:
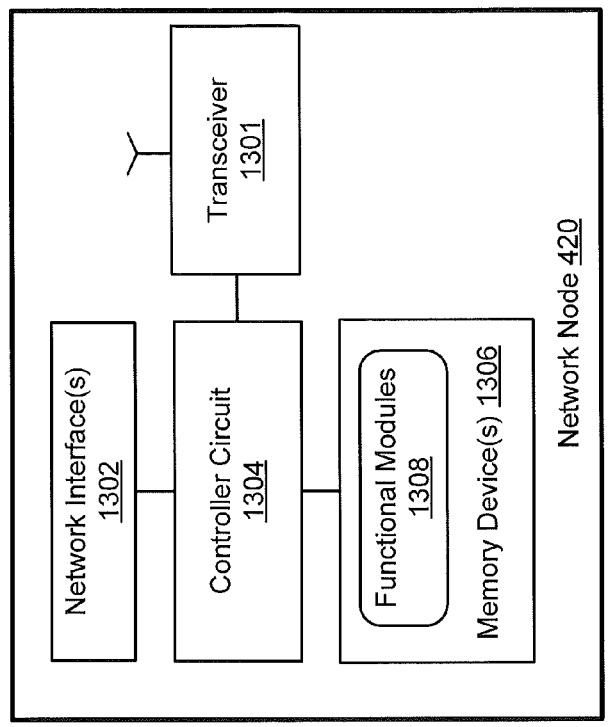
FIG. 13 is a block diagram of the network node of the communications system of FIG. 4 that is configured according to some embodiments of the present invention.

FIG. 13 is a block diagram of the Node B 420 of FIG. 4 or another network node that is configured according to some embodiments. The Node B 420 includes a transceiver 1301, a network interface(s) 1302, a controller circuit 1304, and a memory device(s) 1306 containing functional modules 1308.

The transceiver 1301 (e.g., WCDMA, LTE, or other cellular transceiver, Bluetooth transceiver, WiFi transceiver, WiMax transceiver, etc.) is configured to communicate with the UE 410 or another node of the communication system 400 or another communication system. The controller circuit 1304 may include one or more data processing circuits, such as a general purpose and/or special purpose processor (e.g., microprocessor and/or digital signal processor). The controller circuit 1304 is configured to execute computer program instructions from the functional modules 1308 of the memory device(s) 1306, described below as a computer readable medium, to perform at least some of the operations and methods of FIGS. 1-11 described herein as being performed by a network node. The network interface 1302 communicates with the radio network controller 130 and/or the core network 140.

Further Definitions and Embodiments

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When a node is referred to as being "connected", "coupled", "responsive", or variants thereof to another node, it can be directly connected, coupled, or responsive to the other node or intervening nodes may be present. In contrast, when an node is referred to as being "directly connected", "directly coupled", "directly responsive", or variants thereof to another node, there are no intervening nodes present. Like numbers refer to like nodes throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, nodes, steps, components or functions but does not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

What is claimed is:

1. A network node of a communications system, the network node comprising:
   a transceiver configured to communicate with a user equipment node, UE; and
   a controller circuit connected to the transceiver to transmit and receive, and is configured to repetitively transmit first uplink transmission power control, TPC, commands on a first physical channel with a first channel configuration while repetitively transmitting second uplink TPC commands on a second physical channel with a second channel configuration, wherein the first and second uplink TPC commands control uplink transmission power from the UE to the network node, wherein the controller circuit is further configured to:
   receive a message indicating that the network node and the UE will switch from a first state of controlling uplink transmission power responsive to the first uplink TPC commands to a second state of controlling uplink transmission power responsive to the second uplink TPC commands;
   determine a target uplink transmission power level for the UE to use for an initial uplink transmission after switching from the first state to the second state, in response to receiving the message; and
   controlling values of the second uplink TPC commands to cause the UE to transmit the initial uplink transmission at the target uplink transmission power level.

2. The network node of claim 1, wherein the controller circuit is further configured to:
   repetitively transmit the first uplink TPC commands on a first fractional dedicated physical channel, F-DPCH, with a CELL_FACH configuration; and
   repetitively transmit the second uplink TPC commands on a second F-DPCH with a CELL_DCH configuration and/or a Dedicated Physical Control CHannel.

3. The network node of claim 2, wherein the controller circuit is further configured to transmit the first uplink TPC commands on the first F-DPCH with a different timing, channel scrambling, and/or channel coding than the second uplink TPC commands transmitted on the second F-DPCH.

4. The network node of claim 1, wherein the controller circuit is further configured to:
   initiate the repetitive transmissions of the first uplink TPC commands;
   receive a message indicating that the network node and the UE will switch states from a first state controlling uplink transmission power responsive to the first uplink TPC commands to a second state controlling uplink transmission power responsive to the second uplink TPC commands;
   initiate the repetitive transmissions of the second uplink TPC commands in response to receiving the message and while maintaining the repetitive transmissions of the first uplink TPC commands; and
   cease the repetitive transmissions of the first uplink TPC commands responsive to a determination that the UE has switched states.

5. The network node of claim 4, wherein the controller circuit is further configured to cease the repetitive transmissions of the first uplink TPC commands in response to detecting that the UE has switched states and is now transmitting on a dedicated physical control channel, DPCCH, with a CELL_DCH configuration.

6. The network node of claim 4, wherein the controller circuit is further configured to:
   control values of the first uplink TPC commands in response to values of the first uplink TPC commands until a determination is made that the UE has switched from a first state of controlling uplink transmission power responsive to the first uplink TPC commands to a second state of controlling uplink transmission power responsive to the second uplink TPC commands; and
   responsive to the determination that the UE has switched from the first state to the second state, control values of the second uplink TPC commands in response to conditions of an uplink channel from the UE to the network node.

7. The network node of claim 1, wherein the controller circuit is further configured to determine the target uplink transmission power level in response to a present uplink transmission power level of the UE in the first state and a difference in transmission time interval, channel coding, and/or communication service of the UE between the first state and the second state.

8. The network node of claim 1, wherein the controller circuit is further configured to:
receive a message indicating that the network node and the UE will switch from a first state of controlling uplink transmission power responsive to the first uplink TPC commands to a second state of controlling uplink transmission power responsive to the second uplink TPC commands;
receive first downlink TPC commands from the UE on a third physical channel with a third channel configuration while the UE operates in the first state; and
control downlink transmission power of the first and second uplink TPC commands transmitted from the network node to the UE in response to the first downlink TPC commands.

9. The network node of claim 8, wherein the controller circuit is further configured to respond to a determination that the UE has switched from the first state to the second state by controlling downlink transmission power of the second uplink TPC commands transmitted from the network node to the UE in response to second downlink TPC commands received from the UE on a fourth physical channel having a fourth channel configuration.

10. The network node of claim 9, wherein:
the third physical channel is a dedicated physical control channel, DPCCH, with a CELL_FACH configuration; and
the fourth physical channel is another DPCCH with a CELL_DCH configuration.

11. The network node of claim 8, wherein the controller circuit is further configured to:
determine that the UE has stopped uplink transmissions to the network node, while the UE switches from the first state to the second state, in response to an absence of receipt of first downlink TPC commands from the UE for a first time duration;
track the first downlink TPC commands that have been used by the network node to control downlink transmission power during a second time duration prior to the determination that the UE has stopped uplink transmissions to the network node;
determine a downlink transmission power level that was last commanded by the UE before stopping uplink transmissions in response to the first downlink TPC commands tracked during the second time duration; and
control downlink transmission power to the UE responsive to the determined downlink transmission power while the UE has stopped uplink transmissions.

12. The network node of claim 11, wherein the first time duration is equal to the second time duration.

13. The network node of claim 8, wherein the controller circuit is further configured to:
maintain the downlink transmission power of the second uplink TPC commands transmitted from the network node to the UE at a constant power level relative to the first uplink TPC commands until determining that the UE has switched from the first state to the second state.

14. A user equipment node, UE, comprising:
a transceiver configured to communicate with a network node of a communication system; and
a controller circuit connected to the transceiver to transmit and receive, and is configured to receive a message from the network node commanding the UE to switch from a first state, that controls uplink transmission power to the network node responsive to first uplink transmission power control, TPC, commands received on a first physical channel with a first channel configuration, to a second state, that controls uplink transmission power to the network node responsive to second uplink TPC commands received on a second physical channel with a second channel configuration; and
respond to the message by beginning uplink transmission at a power that is controlled by the second uplink TPC commands received from the network node following a UE uplink transmission gap while switching from the first state to the second state, wherein the controller circuit is further configured to:
estimate received power levels of signals received on the first physical channel and transmit responsive first downlink TPC commands on a third physical channel with a third channel configuration to the network node to regulate power of the first uplink TPC commands transmitted from the network node; and
respond to the message by estimating received power levels of signals received on the second physical channel and transmitting responsive second downlink TPC commands on a fourth physical channel with a fourth channel configuration to the network node to regulate power of the second uplink TPC commands transmitted from the network node while switching from the first state to the second state.

15. The UE of claim 14, wherein the controller circuit is further configured to respond to the message by ceasing monitoring of the first physical channel for the first uplink TPC commands and initiating monitoring of the second physical channel for the second uplink TPC commands while switching from the first state to the second state.

16. The UE of claim 14, wherein the controller circuit is further configured to respond to the message by asynchronously switching from the first state to the second state without synchronizing with the network node a timing of when the UE will perform the state switching.

17. The UE of claim 14, wherein the controller circuit is further configured to:
control uplink transmission power to the network node responsive to the first uplink TPC commands received on a first fractional dedicated physical channel, F-DPCH, with a CELL_FACH configuration; and
control uplink transmission power to the network node responsive to the second uplink TPC commands received on a second F-DPCH and/or a dedicated physical control channel, DPCCH, with a CELL_DCH configuration.

18. The UE of claim 14, wherein:
the third physical channel is a dedicated physical control channel, DPCCH, with a CELL_FACH configuration; and
the fourth physical channel is another DPCCH with a CELL_DCH configuration.

19. A method for power control in a user equipment node, UE, that communicates with a network node in a communications system, the method comprising:
receiving a message from the network node commanding the UE to switch from a first state, that controls uplink transmission power to the network node responsive to first uplink TPC commands received on a first physical channel with a first channel configuration, to a second state, that controls uplink transmission power to the network node responsive to second uplink TPC commands received on a second physical channel with a second channel configuration; and
responding to the message by beginning uplink transmission at a power that is controlled by the second uplink TPC commands received from the network node following a UE uplink transmission gap while switching from the first state to the second state, wherein the first uplink TPC are received on a first fractional dedicated physical channel, F-DPCH, with a CELL_FACH configuration, wherein the second uplink TPC are received on a second F-DPCH and/or a dedicated physical control channel, DPCCH, with a CELL_DCH configuration, and further comprising responding to the message by ceasing monitoring of the first F-DPCH for the first uplink TPC commands and initiating monitoring of the second F-DPCH and/or the DPCCH for the second uplink TPC commands while switching from the first state to the second state.

\* \* \* \* \*